United States Patent
Reinig et al.

(10) Patent No.: US 10,127,171 B2
(45) Date of Patent: Nov. 13, 2018

(54) CIRCUIT ARRANGEMENT, NETWORK-ON-CHIP AND METHOD FOR TRANSMITTING INFORMATION

(75) Inventors: Helmut Reinig, Isen (DE); Soeren Sonntag, Munich (DE)

(73) Assignee: Infineon Technologies AG, Neubiberg (DE)

(*) Notice: Subject to any disclaimer, the term of this patent is extended or adjusted under 35 U.S.C. 154(b) by 99 days.

(21) Appl. No.: 12/874,250

(22) Filed: Sep. 2, 2010

(65) Prior Publication Data
US 2011/0075656 A1    Mar. 31, 2011

(30) Foreign Application Priority Data
Sep. 29, 2009  (DE) .......... 10 2009 043 451

(51) Int. Cl.
G06F 13/40    (2006.01)

(52) U.S. Cl.
CPC .......... *G06F 13/4022* (2013.01); *Y02D 10/14* (2018.01); *Y02D 10/151* (2018.01)

(58) Field of Classification Search
CPC .... G06F 13/4022; Y02D 10/14; Y02D 10/151
USPC ..... 370/352, 351, 356; 326/41; 710/28, 110, 710/244
See application file for complete search history.

(56) References Cited

U.S. PATENT DOCUMENTS

| | | | |
|---|---|---|---|
| 6,526,462 B1* | 2/2003 | Elabd .................... | G06F 9/5016 710/242 |
| 6,581,130 B1* | 6/2003 | Brinkmann et al. ......... | 710/306 |
| 7,701,252 B1* | 4/2010 | Chow et al. .................... | 326/41 |
| 7,778,815 B2* | 8/2010 | Pasricha et al. ................ | 703/22 |
| 8,433,874 B2* | 4/2013 | Oh ...................... | G06F 12/0653 710/9 |
| 2004/0088477 A1* | 5/2004 | Bullen .................. | H04L 49/901 711/109 |
| 2005/0289374 A1* | 12/2005 | Kim et al. ..................... | 713/300 |
| 2007/0234006 A1* | 10/2007 | Radulescu et al. ............. | 712/28 |
| 2008/0059669 A1* | 3/2008 | Lin ............................... | 710/110 |
| 2008/0130651 A1* | 6/2008 | Lin ............................... | 370/394 |
| 2008/0256377 A1* | 10/2008 | Pontius et al. ................. | 713/324 |
| 2008/0276018 A1* | 11/2008 | Hayter et al. ................... | 710/62 |
| 2009/0271536 A1* | 10/2009 | Tiennot ........................... | 710/28 |
| 2010/0017893 A1* | 1/2010 | Foley ...................... | G06F 21/74 726/34 |
| 2010/0074175 A1* | 3/2010 | Banks ................... | H04L 1/1867 370/328 |

* cited by examiner

*Primary Examiner* — Khaled Kassim
(74) *Attorney, Agent, or Firm* — Eschweiler & Potashnik, LLC (57) ABSTRACT

A circuit arrangement, network-on-chip, and a method for transmitting information are disclosed. In one embodiment, an electrical circuit is provided comprising a plurality of circuit blocks comprising a first circuit block, a second circuit block, and a third circuit block, and a connection structure coupled to the plurality of circuit blocks, wherein the first circuit block is configured to send a request comprising information corresponding to the request and an address onto the connection structure, wherein the second circuit block is configured to initiate a transmission onto the connection structure in response to receiving the request, and wherein the third circuit block is configured to receive the transmission and wherein the address is assigned to the third circuit block.

21 Claims, 5 Drawing Sheets

CIRCUIT ARRANGEMENT, NETWORK-ON-CHIP AND METHOD FOR TRANSMITTING INFORMATION

CROSS REFERENCE TO RELATED APPLICATIONS

The present invention claims priority to a German patent application entitled "Schaltungsanordnung, Network-on-Chip and Verfahren zum Übertragen von Informationen", filed on Sep. 29, 2009, patent application number 102009043451.8, the entire content of which is herein incorporated by reference.

TECHNICAL FIELD

The present invention relates to a circuit arrangement, a network-on-chip, and a method for transmitting information.

BACKGROUND

Within a system, the communication between components can be effected in various ways. By way of example, the components are connected to one another via a bus system and an interchange between the components is effected via identical transport and control lines. The system can contain master components and slave components, wherein a master is an active bus component that can initiate a transaction on the bus. A slave, by contrast, is a passive bus component that only communicates on the bus if it is requested to do so.

One example of a system comprising a plurality of components is a processor system. The processor system can contain a component which performs a direct memory access (DMA) in order to relieve the burden on the processor during a transfer of large volumes of data. During a DMA access, by way of example, data are transmitted from a memory component to a peripheral component, wherein the DMA component is a master and the memory component and the peripheral component are in each case a slave. The DMA component sends a read request to the memory component, which then sends the requested data to the DMA component. The DMA component then sends the data to the peripheral component, which processes the data further. However, in such a system, the data have to be transmitted twice within a DMA access, which is complex and costly.

SUMMARY OF INVENTION

The present disclosure provides a circuit arrangement, a network-on-chip, and a method for transmitting information. In one embodiment, an electrical circuit is provided comprising a plurality of circuit blocks comprising a first circuit block, a second circuit block, and a third circuit block, and a connection structure coupled to the plurality of circuit blocks, wherein the first circuit block is configured to send a request comprising information corresponding to the request and an address onto the connection structure, wherein the second circuit block is configured to initiate a transmission onto the connection structure in response to receiving the request, and wherein the third circuit block is configured to receive the transmission and wherein the address is assigned to the third circuit block.

In another embodiment, a method for transmitting information is provided. The method comprising providing a plurality of circuit blocks comprising a first circuit block, a second circuit block, and a third circuit block; sending a request from the first circuit block to the second circuit block, initiating a transmission by the second circuit block in response to receiving the request, sending information corresponding to the request and an address from the second circuit block to a third circuit block based on the address, wherein the address is assigned to the third circuit block.

DETAIL DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
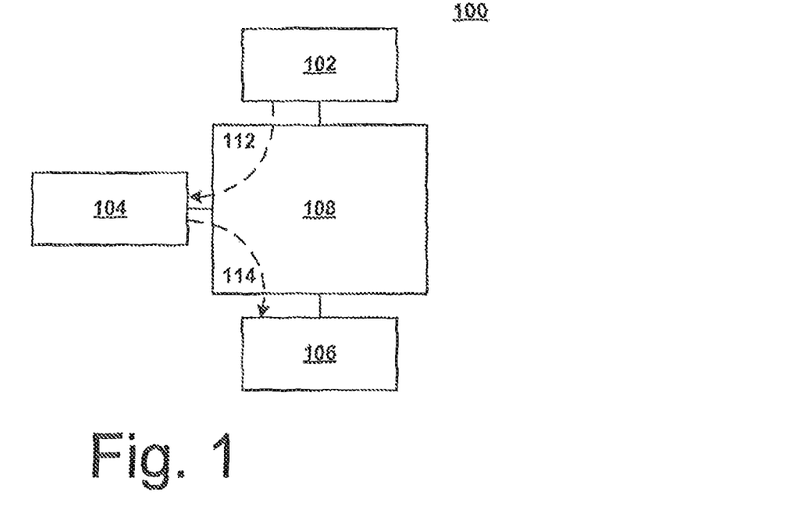
FIGS. 1-7 are schematic illustrations of various circuit arrangements in accordance with different embodiments of the present disclosure.

Referring to FIG. 1, a schematic illustration of a circuit arrangement is depicted in accordance with one embodiment of the present disclosure. In this embodiment, circuit arrangement 100 comprises a first circuit block 102, a second circuit block 104, a third circuit block 106 and a connection structure 108. Circuit blocks 102, 104, 106 are coupled to one another via connection structure 108.

During a first transmission, as represented by the arrow 112, the first circuit block 102 sends a request onto the connection structure 108 and the second circuit block 104 receives this request. The request may be a write operation or a read operation, for example.

During a second transmission, as represented by the arrow 114, the second circuit block 104 initiates a transmission onto the connection structure 108 responsive to the request received from the first circuit block 102. During the second transmission, information corresponding to the request from first circuit block 102 is sent along with an address onto the connection structure 108. This information may comprise, for example, read data or an indication of a conclusion of a write operation. The address of the information in this case is assigned to the third circuit block 106. The third circuit block 106 is a circuit block to which a response of the request is sent. The third circuit block 106 or the connection structure 108 recognizes that the address of the information transmitted onto the connection structure 108 is intended for the third circuit block 106 and the third circuit block 106 receives the information.

In one embodiment, the address which is sent during the second transmission 114 together with the information from the second circuit block 104 originates from the first circuit block 102, for example. The first circuit block 102 sends the address together with the request during the first transmission 112. In an alternative embodiment, the first circuit block 102 does not send an explicit address, but rather an indicator from which the address may be derived. The second circuit block 104 then determines the address from the indicator.

In this embodiment, the first circuit block 102 is a subscriber of circuit arrangement 100, which instigates sending of a request during the first transmission 112. The first circuit block 102 may be designated as a master subscriber. The second circuit block 104 is a subscriber of the circuit arrangement 100 which, during the second transmission 114, initiates a transmission onto the connection structure 108 after receiving the request from the first circuit block 102. During this transmission, the second circuit block 104 sends the information to the third circuit block 106. Thus, the second circuit block 104 reacts or replies to the request from the first circuit block 102 by sending information to the third circuit block 106. The second circuit block 104 may be designated as a modified slave subscriber, which has an extended functionality different from a pure slave subscriber. In contrast to a pure slave subscriber, the second circuit block 104 does not send the information back to the first circuit block 102, from which it received the request. Instead, the second circuit block 104 sends the information to another circuit block, for example, the third circuit block 106. In that case, the second circuit block 104 may initiate a transmission to the third circuit block 106 on its own. In contrast to a master subscriber, the second circuit block 104 may initiate a transmission only in response to receiving a request from the first circuit block 102.

As shown in FIG. 1, during the first transmission 112, a request is sent from the first circuit block 102 to the second circuit block 104. During the second transmission 114, information corresponding to the request is not sent back to the first circuit block 102, but instead transmitted directly to the third circuit block 106. The first circuit block 102 is not linked to the second transmission 114 and, consequently, no resources of the first circuit block 102 are taken up and no switching activity is generated in the first circuit block 102. In addition, because the information is transmitted only once onto the connection structure 108, data volume and switching activity on the construction structure 108 are minimized. Low switching activity means lower dynamic power consumption in circuit arrangement 100.

Since the information is transmitted directly from the second circuit block 104 to the third circuit block 106, no buffer-storage of the information is needed in the first circuit block 102. This leads to lower area requirement for the first circuit block 102 and the circuit arrangement 100 and, consequently, lower static power consumption in circuit arrangement 100. Moreover, direct transmission of the information causes the request sent by the first circuit block 102 to be implemented rapidly, which provides better performance of circuit arrangement.

Figure 2:
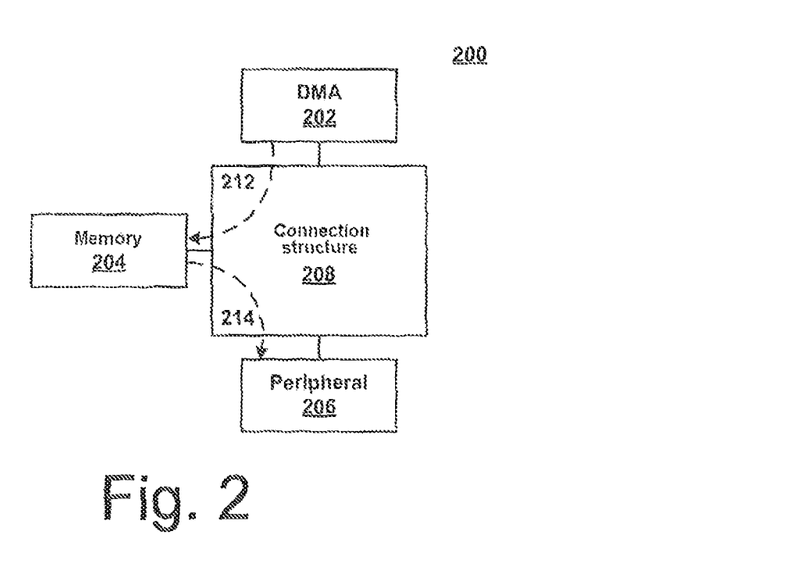

FIG. 2 shows a schematic illustration of a circuit arrangement in accordance with an alternative embodiment of the present disclosure. In this embodiment, circuit arrangement 200 comprises a first circuit block 202, a second circuit block 204, a third circuit block 206, and a connection structure 208. The circuit blocks 202, 204, 206 are coupled to one another via the connection structure 208. The first circuit block 202 is a DMA block, the second circuit block 204 is a memory block and the third circuit block 206 is a peripheral block. The sequence represented by the arrows 212, 214 shows a read operation initiated by the DMA block 202. During the DMA read operation, data are transmitted from the memory block 204 to the peripheral block 206, which processes the data further.

In a first step, as represented by the arrow 212, the DMA block 202 sends a read request together with an address to the memory block 204. In this case, the address corresponds to the address of the peripheral block 206, which processes further the data read. In a second step, as represented by the arrow 214, the memory block 204 implements the read request by sending the data requested by the DMA block 202. In this case, the data is transmitted by the memory block 204 together with the address onto the connection structure 208 and the peripheral block 206 recognizes the address to which the data is intended.

The data requested by the DMA block 202 are then transmitted from the memory block 204 via the connection structure 208 directly to the peripheral block 206, without the data being sent via another circuit block. The data is therefore transmitted only once on the connection structure 208, as a result the data traffic of the connection structure 208 is reduced. The switching activity on the connection structure 208 is also reduced, and therefore lowers the dynamic power consumption of the circuit arrangement 200. Furthermore, due to the direct transmission of the data from the memory block 204 to the peripheral block 206, it is not necessary to provide any buffer memories in other circuit blocks to store the data. For example, the DMA block 202 does not have any internal memory to buffer-store data. This leads to reduced area requirement in the DMA block 202 and the circuit arrangement 200.

In the case of the circuit arrangement 200 shown in FIG. 2, the DMA block 202 is a master subscriber that actively initiates the read operation by sending a read request together with an address via the connection structure 208 to the memory block 204. The peripheral block 206 is a slave subscriber that reads and processes the data sent by the memory block 204, but does not itself initiate any transaction onto the connection structure 208. The memory block 204 is a subscriber within the circuit arrangement 200 that does not initiate any operation, such as a read operation, onto the connection structure 206, but transmits the data requested by the DMA block 202 together with the address communicated by the DMA block 202 actively onto the connection structure 208. The memory block 204 can be designated as a modified slave subscriber which, although it does not itself actively initiate any operation, nevertheless transmits, as a response to the read request of the DMA block 202, information that is part of a read operation together with an address communicated to it actively onto the connection structure 208.

Figure 3:
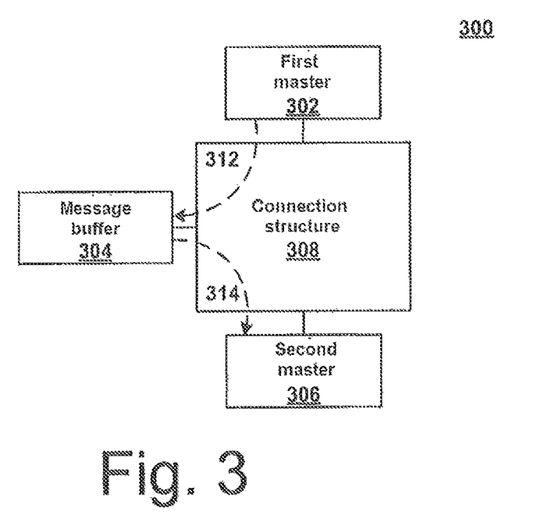

FIG. 3 shows a schematic illustration of a circuit arrangement in accordance with yet another alternative embodiment of the present disclosure. Circuit arrangement 300 comprises a first circuit block 302, a second circuit block 304, a third circuit block 306 and a connection structure 308. The circuit blocks 302, 304, 306 are coupled to one another via the connection structure 308. The first circuit block 302 is a first master block, the second circuit block 304 is a message buffer and the third circuit block 306 is a second master block. The sequence represented by the arrows 312, 314 shows a write operation initiated by the first master block 302. During the write operation, data or message may be transmitted from the first master block 302 to the message buffer 304. The message buffer 304 is assigned to the second master block 306, which processes the transmitted message further.

In a first step, as represented by the arrow 312, the first master block 302 sends write data or a message together with an address to the message buffer 304 via the connection structure 308. The address corresponds to the address of the second master block 306. After the message is transmitted into the message buffer 304, in a second step, as represented by the arrow 314, the message buffer 304 sends a write reply together with the previously received address to the connection structure 308. The write reply may be sent in the form of an interrupt, for example. In this case, the message buffer 304 sends the address previously received from the first master block 302 in an unchanged form. The second master block 306 recognizes from the address that a write reply is intended for it, and it further recognizes that write data has arrived in its message buffer 304, and so it may begin processing of the data.

The receiving block, second master block 306, receives directly from its message buffer 304 information that the data has arrived in the message buffer 304, thus the write operation is concluded. The sending block, first master block 302, does not have to send a notification to the receiving, second master block 306. By way of example, the first master block 302 does not have to initiate an interrupt in order to inform the second master block 306 of the arrival of the data in the message buffer 304. Since no interrupt is initiated, a context change in the first master block 302 is not necessary either, and no delay on account of a context exchange occurs. The circuit arrangement 300 therefore has a good performance.

In the case of the circuit arrangement 300 illustrated in FIG. 3, the message buffer 304 is a modified slave subscriber similar to the memory block 204 from FIG. 2. The message buffer 304 does not itself actively initiate an operation within the circuit arrangement 300. However, it may send a write reply, which is part of a write operation, together with a previously communicated address actively onto the connection structure 308.

Figure 4:
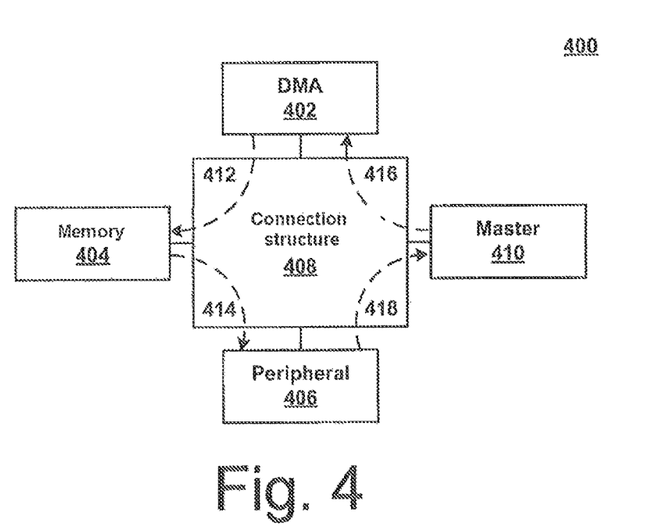

FIG. 4 shows a schematic illustration of a circuit arrangement in accordance with yet another alternative embodiment of the present disclosure. In this embodiment, circuit arrangement 400 comprises a first circuit block 402, a second circuit block 404, a third circuit block 406, a fourth circuit block 410, and a connection structure 408. The first circuit block 402 is a DMA block, the second circuit block 404 is a memory block, the third circuit block 406 is a peripheral block, and the fourth circuit block 410 is a master block. The circuit arrangement 400 is a development of circuit arrangement 200 shown in FIG. 2 to the effect that the second circuit block 404 receives an additional address, which is assigned to the fourth circuit block 410. The sequence represented by the arrows 412, 414, 416, 418 shows a read operation during which data is transmitted from the memory block 404 to the peripheral block 406.

In a first step, as represented by the arrow 416, the master block 410 configures the DMA block 402 and initiates a DMA transfer in this case. In a second step, as represented by the arrow 412, the DMA block 402 sends a read request together with a first address and a second address to the memory block 404. The first address corresponds to the address of the peripheral block 406, which processes the transmitted data further during the read operation. The second address corresponds to the address of the master block 410, which initiates the DMA transfer.

In a third step, as represented by the arrow 414, the memory block 404 sends the data requested by the DMA block 402. The data are sent by the memory block 404 together with the first address and the second address onto the connection structure 408. The peripheral block 406 recognizes that the data is intended for it based on the first address, which corresponds to its address. In a fourth step, as represented by the arrow 418, the peripheral block 406 sends a reply together with the previously received second address to the connection structure 408. The master block 410 recognizes from the second address that the reply is intended for it. By means of the reply, the master block 410 is notified that data has arrived in the peripheral block 406.

Figure 5:
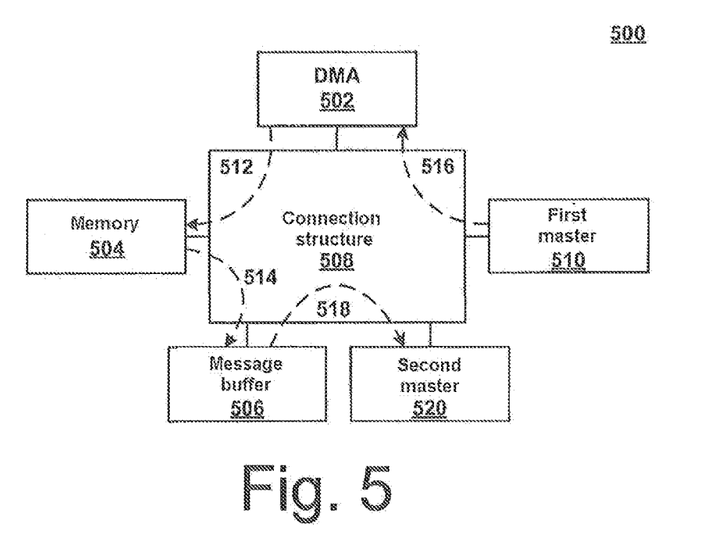

FIG. 5 shows a schematic illustration of a circuit arrangement is depicted in accordance with an alternative embodiment of the present disclosure. Circuit arrangement 500 comprises a first circuit block 502, a second circuit block 504, a third circuit block 506, a fourth circuit block 510, a fifth circuit block 520 and a connection structure 508. The first circuit block 502 is a DMA block, the circuit block 504 is a memory block, the third circuit block 506 is a message buffer, the fourth circuit block 510 is a first master block, and the fifth circuit block 520 is a second master block.

In a manner similar to that in the case of the circuit arrangement 400 shown in FIG. 4, the second circuit block 504 receives an additional address. In contrast to FIG. 4, however, this additional address is not assigned to the fourth circuit block 510, but rather to the fifth circuit block 520. The sequence represented by the arrows 512, 514, 516, 518 shows a read operation during which data or a message is transmitted from the memory block 504 to the message buffer 506. The message buffer 506 is assigned to the second master block 520.

In a first step, as represented by the arrow 516, the first master block 510 configures the DMA block 502 and initiates a DMA transfer in this case. In a second step, as represented by the arrow 512, the DMA block 502 sends a read request together with a first address and a second address to the memory block 504. The first address corresponds to the address of the message buffer 506, which stores the message transmitted during the read operation. The second address corresponds to the address of the second master block 520, which processes further the message stored in its message buffer.

In a third step, as represented by the arrow 514, the memory block 504 sends the message requested by the DMA block 502. The message is sent by the memory block 504 together with the first address and the second address onto the connection structure 508. The message buffer 506 recognizes the message intended for it based on the first address, which corresponds to its address. In a fourth step, as represented by the arrow 518, the message buffer 506 sends a reply together with the previously received second address to the connection structure 508. The second master block 520 recognizes from the second address that the reply is intended for it, that the message has arrived in its message buffer 506, and that it may now begin the processing of the message.

The receiving block, second master block 520, receives directly from the message buffer 506 a notification that the message has arrived in the message buffer 504, and the write operation is concluded. Neither the DMA block 502 nor the sending block, first master block 510, has to be included in this case. By way of example, neither the DMA block 502 nor the first master block 510 has to initiate an interrupt in order to inform the second master block 520 of the arrival of the message in the message buffer 506. Consequently, by way of example, a context change in the first master block 510 is not necessary. In a manner similar to that already described with reference to FIG. 3, a good performance of the circuit arrangement 500 may be achieved.

Furthermore, the message requested by the DMA block 502 is transmitted by the memory block 504 via the connection structure 508 directly to the message buffer 506. Consequently, the message need not be transmitted via any other circuit block or stored in any other circuit block. In a manner similar to that already described with reference to FIG. 2, data traffic on the connection structure 508 and area requirement of the circuit arrangement 500 are thus reduced.

Figure 6:
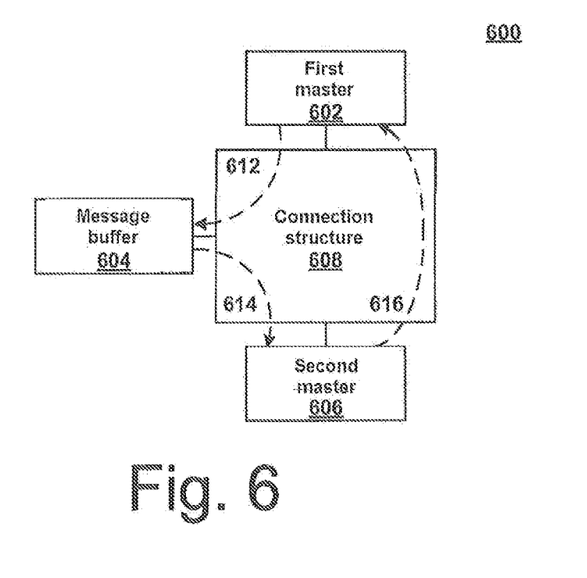

FIG. 6 shows a schematic illustration of the circuit arrangement in accordance with yet another embodiment of the present disclosure. The circuit arrangement 600 comprises a first circuit block 602, a second circuit block 604, a third circuit block 606 and a connection structure 608. The first circuit block 602 is a first master block, the second circuit block 604 is a message buffer and the third circuit block 606 is a second master block. The sequence represented by the arrows 612, 614, 616 shows a write operation during which data are transmitted from the first master block 602 to the message buffer 604. The circuit arrangement 600 is a development of the circuit arrangement 300 shown in FIG. 3 to the effect that the message buffer 604 receives an additional address, which is assigned to the first master block 602.

In the first step, represented by the arrow 612, write data is sent together with a first address and a second address to the message buffer 604 via the connection structure 608. The first address corresponds to the address of the second master block 606 and the second address corresponds to the address of the first master block 602. After the write data have been transmitted into the message buffer 604, the message buffer 604 sends, in a second step, as represented by the arrow 614, a write reply together with the previously received first and second addresses to the connection structure 608. The second master block 606 recognizes based on the first address that the write reply is intended for it, and it furthermore recognizes that write data has arrived in its message buffer 604.

In a third step, as represented by the arrow 616, the second master block 606 sends a further write reply together with the previously received second address to the connection structure 608. In this case, the second master block 606 does not change the previously received second address. The first master block 602 recognizes from the second address that the further write reply is intended for it. Moreover, the sending block, first master block 602, receives by means of the further write reply an acknowledgement that the receiving block, second master block 606, has been notified of the arrival of the data in its message buffer 604. The acknowledgement by the second master block 606 may be effected directly after it has received the write reply. Alternatively, the acknowledgement by the second master block 606 may be effected after the second master block 606 has wholly or partly processed the information in the message buffer 604 or has processed other information.

Figure 7:
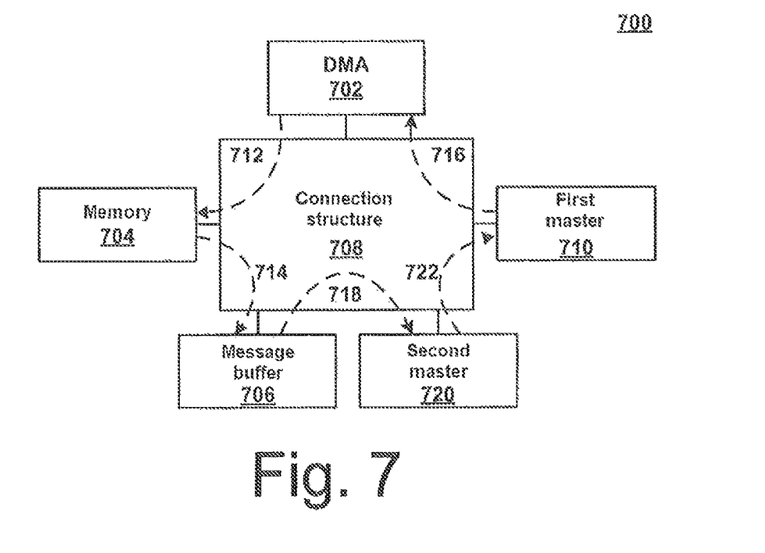

FIG. 7 shows a schematic illustration of the circuit arrangement in accordance with yet another embodiment of the present disclosure. The circuit arrangement 700 comprises a first circuit block 702, a second circuit block 704, a third circuit block 706, a fourth circuit block 710, a fifth circuit block 720 and a connection structure 708. The first circuit block 702 is a DMA block, the second circuit block 704 is a memory block, the third circuit block 706 is a message buffer, the fourth circuit block 710 is a first master block, and the fifth circuit block 720 is a second master block. The circuit arrangement 700 is a development of the circuit arrangement 500 shown in FIG. 5 to the effect that the second circuit block 704 receives a third address in addition to a first and a second address, the third address being assigned to the fourth circuit block 710. The sequence represented by the arrows 712, 714, 716, 718, 722 shows a read operation during which a message is transmitted from the memory block 704 to the message buffer 706, wherein the message buffer 706 is associated with the second master block 720.

In a first step, as represented by the arrow 716, the first master block 710 configures the DMA block 702 and initiates a DMA transfer in this case. In a second step, as represented by the arrow 712, the DMA block 702 sends a read request together with a first address, a second address, and a third address to the memory block 704. The first address corresponds to the address of the message buffer 706, which stores the message transmitted during the read operation. The second address corresponds to the address of the second master block 720, which processes further the message stored in its message buffer 706. The third address corresponds to the address of the first master block 710.

In a third step, as represented by the arrow 714, the memory block 704 sends the message requested by the DMA block 702. The message is sent by the memory block 704 together with the first address, the second address, and the third address on the connection structure 708 and the message buffer 706 recognizes the message intended for it based on the first address, which corresponds to its address.

In a fourth step, as represented by the arrow 718, the message buffer 706 sends a reply together with the previously received second and third addresses to the connection structure 708. The second master block 720 recognizes from the second address that a reply is intended for it, that the message has arrived in its message buffer 706 and that it may now begin processing of the message. In a fifth step, as represented by the arrow 722, the second master block 720 sends a further reply together with the previously received third address to the connection structure 708. In this case, the second master block 720 does not change the previously received third address. The first master block 710 recognizes based on the third address that the further reply is intended for it. Moreover, the sending block, first master block 710, receives by means of the further reply an acknowledgement that the receiving block, second master block 720, has been notified of the arrival of the data in its message buffer 706.

The information or message, described with reference to FIGS. 1-7, which is sent by the second circuit block 104, 204, 304, 404, 504, 604, 704 and is received by the third circuit block 106, 206, 306, 406, 506, 606, 706 is, for example, useful data, check data, a cache line of a processor or interrupt data. In one embodiment, the information or message contains a plurality of bits. In another embodiment, the information or message contains only one bit.

The connection structure 108, 208, 308, 408, 508, 608, 708 described with reference to FIGS. 1-7 above is, for example, a bus system comprising a data bus, an address bus and at least one control line. In one embodiment, the data bus and the address bus are not separate, but rather share lines of the bus system by means of a multiplex method. In one embodiment, the bus system contains a read data bus and a write data bus separate from the read data bus. The bus system can be coupled to each of the circuit blocks of the circuit arrangement 100, 200, 300, 400, 500, 600, 700, such that each of the circuit blocks may be addressed via the bus system. In another embodiment, the connection structure 108, 208, 308, 408, 508, 608, 708 is a crossbar distributor or a connection matrix, designated as "crossbar", and, in a further embodiment, the connection structure 108, 208, 308, 408, 508, 608, 708 is a network-on-chip.

A transmission on the connection structure 108, 208, 308, 408, 508, 608, 708 may be effected, for example, serially or in parallel, in a wire-based manner or wirelessly. The transmission may additionally be effected in a packet-oriented manner. In this case, the address described with reference to FIGS. 1-7, first address, second address and/or third address, may be transmitted in one packet, for example, in the header of the packet. In another embodiment, these addresses may also be transmitted in a plurality of packets.

As described with reference to FIGS. 1-7 above, the second circuit block 104, 204, 304, 404, 504, 604, 704 sends at least one address. In one embodiment, this address is uniquely assigned to a circuit block of the circuit arrangement 100, 200, 300, 400, 500, 600, 700. As described with reference to FIGS. 2-7, the second circuit block 104, 204, 304, 404, 504, 604, 704 receives the at least one address from the first circuit block 102, 202, 302, 402, 502, 602, 702 and sends the at least one address in an unchanged form. In another embodiment, the second circuit block 104, 204, 304, 404, 504, 604, 704 does not explicitly receive the at least one address from the first circuit block 102, 202, 302, 402, 502, 602, 702, but rather receives an indicator from which it can derive the at least one address. By way of example, the second circuit block determines the at least one address from an indicator by means of a look-up table, by means of a microprogram, by means of an external memory, by means of decoding or calculation.

In one embodiment, the second circuit block 104, 204, 304, 404, 504, 604, 704 does not receive the at least one address from the first circuit block 102, 202, 302, 402, 502, 602, 702, but rather from a different source. By way of example, the second circuit block 104, 204, 304, 404, 504, 604, 704 receives the at least one address from a central arbiter of the circuit arrangement 100, 200, 300, 400, 500, 600, 700.

The at least one address sent by the second circuit block 104, 204, 304, 404, 504, 604, 704 is stored in at least one configuration register, for example. The at least one configuration register may be contained in the second circuit block 104, 204, 304, 404, 504, 604, 704. The at least one configuration register is programmed to a specific value, for example, during the production of the circuit arrangement 100, 200, 300, 400, 500, 600, 700 and may no longer be reprogrammed subsequently. In another embodiment, the at least one configuration register is programmed during the operation of the circuit arrangement 100, 200, 300, 400, 500, 600, 700. By way of example, the at least one configuration register is reprogrammed each time before the second circuit block 104, 204, 304, 404, 504, 604, 704 sends one or a plurality of addresses.

The at least one configuration register of the second circuit block 104, 204, 304, 404, 504, 604, 704 may be programmed, for example, via the connection structure 108, 208, 308, 408, 508, 608, 708 or via dedicated configuration lines that are not part of the connection structure 108, 208, 308, 408, 508, 608, 708. In one embodiment, the at least one configuration register is configured via one or a plurality of microfuses.

A circuit arrangement 100, 200, 300, 400, 500, 600, 700, as described in the previous sections may be integrated on a single semiconductor component. Alternatively, integration of the circuit arrangement 100, 200, 300, 400, 500, 600, 700 may be distributed among a plurality of semiconductor components.

Figure 8:
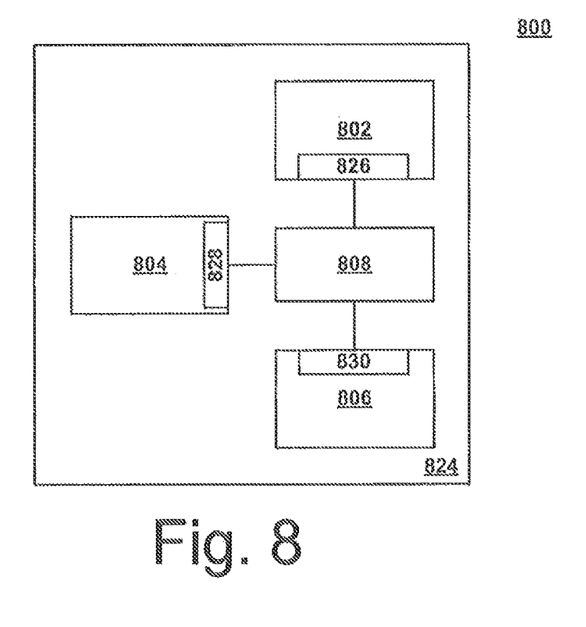
FIG. 8 is a schematic illustration of a network-on-chip in accordance with one embodiment of the present disclosure.

FIG. 8 shows a schematic illustration of a network-on-chip in accordance with one embodiment of the present disclosure. The network-on-chip 800 comprises a circuit arrangement 824 as described in the previous sections. The circuit arrangement comprises a first circuit block 802, a second circuit block 804, a third circuit block 806 and a connection structure 808. Each of the circuit blocks 802, 804, 806 comprises a respective network interface 826, 828, 830 coupled to the connection structure 808. In one embodiment, the circuit blocks 802, 804, 806 of the network-on-chip 800 comprise a peripheral block alongside a network interface 826, 828, 830, wherein a respective network interface is assigned to each peripheral block. In this case, a network interface may perform a communication between a peripheral block and the connection structure 808 of the circuit arrangement 824, such that the peripheral block does not have to be adapted to a respective connection structure, but rather may be used flexibly for different connection structures.

Figure 9:
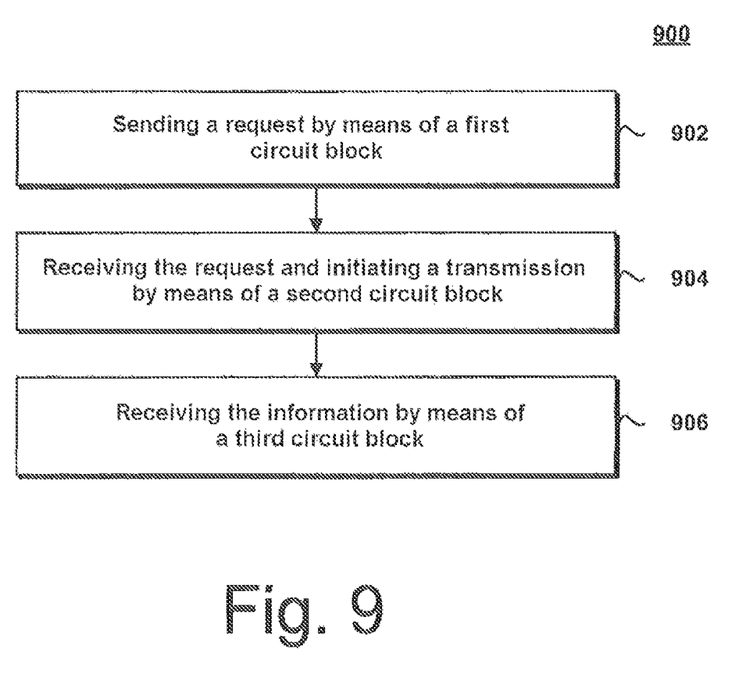
FIG. 9 is a flowchart of an exemplary method for transmitting information in accordance with one embodiment of the present disclosure.

FIG. 9 shows a flowchart of an exemplary method 900 for transmitting information in accordance with one embodiment of the present disclosure. In step 902, a request is sent by means of a first circuit block. The first circuit block belongs to a plurality of circuit blocks that are coupled to one another via a connection structure.

In step 904, the request is received by means of a second circuit block of the plurality of circuit blocks and the second circuit block initiates a transmission. During the transmission, information corresponding to the request is sent together with an address. In step 906, the information is received by means of a third circuit block of the plurality of circuit blocks, wherein the address is assigned to the third circuit block. In one embodiment, the address is sent by means of the first circuit block. In another embodiment, an indicator is sent by means of the first circuit block, wherein the address may be derived from the indicator. By way of example, the second circuit block determines the address from the indicator received from the first circuit block.

In one embodiment, an additional request is sent together with the request by means of the first circuit block. Furthermore, the additional request is sent together with the information by means of the second circuit block. Furthermore, the additional request is received by means of the third circuit block and an additional transmission is initiated by means of the third circuit block. During the additional transmission, additional information corresponding to the additional request is sent together with an additional address.

In one embodiment, the additional address is assigned to a fourth circuit block of the plurality of circuit blocks. In another embodiment, the additional address is assigned to the first circuit block. The method 900 enables fast implementation of the request proceeding from the first circuit block since the information is transmitted directly from the second circuit block to the third circuit block without intervening circuit block, for example, via the first circuit block. Since no other circuit block is involved in the implementation of the request, there is also no need to provide any buffer memory for the information in these other circuit blocks. The method 900 may be carried out by means of one of the embodiments illustrated in FIGS. 1-8.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed:

1. An electrical circuit comprising:
    a plurality of circuit blocks comprising a first circuit block, a second circuit block, and a third circuit block; and
    a connection structure coupled to the plurality of circuit blocks, wherein the first circuit block is configured to send a request comprising information corresponding to the request and a plurality of addresses onto the connection structure,
    wherein the plurality of addresses of the request comprises a first address and a second address, the first address corresponding to the second circuit block, and the second address corresponding to the third circuit block;
    wherein the second circuit block is configured to initiate a transmission onto the connection structure in response to receiving the request, the transmission of the second circuit block including the information corresponding to the request and the second address, and
    wherein the third circuit block is configured to receive the transmission of the second circuit block, and wherein the second address is assigned to the third circuit block;
    wherein the second circuit block comprises at least one configuration register for storing the first address;
    wherein the at least one configuration register is dynamically programmable; and
    wherein the at least one configuration register is programmable via the connection structure.

2. The electrical circuit according to claim 1, wherein the plurality of circuit blocks comprises a plurality of master subscribers and a plurality of slave subscribers.

3. The electrical circuit according to claim 2, wherein the first circuit block comprises a master subscriber.

4. The electrical circuit according to claim 1, wherein the request is a read operation and the information comprises read data of the read operation.

5. The electrical circuit according to claim 1, wherein the request is a write operation and the information comprises an indication of a conclusion of the write operation.

6. The electrical circuit according to claim 1, wherein each of the plurality of circuit blocks is assigned an individual address.

7. The electrical circuit according to claim 1, wherein the at least one configuration register is statically preprogrammed.

8. The electrical circuit according to claim 1, wherein the second circuit block is configured to send the second address unchanged onto the connection structure.

9. The electrical circuit according to claim 1, wherein the first circuit block is configured to send an additional request onto the connection structure.

10. The electrical circuit according to claim 9, wherein the second circuit block is configured to send information corresponding to the additional request onto the connection structure.

11. The electrical circuit according to claim 10, wherein the third circuit block is configured to initiate an additional transmission onto the connection structure in response to receiving the additional request.

12. The electrical circuit according to claim 11, wherein the additional request comprises an additional address.

13. The electrical circuit according to claim 12, wherein the additional address is assigned to a fourth circuit block of the plurality of circuit blocks.

14. An electrical circuit comprising:
    a plurality of circuit blocks comprising a first circuit block, a second circuit block, and a third circuit block; and
    a connection structure coupled to the plurality of circuit blocks, wherein the first circuit block is configured to send a first address, corresponding to the second circuit block, an indicator and a request,
    wherein the second circuit block is configured to derive a second address, corresponding to the third circuit block, from the indicator and initiate a transmission onto the connection structure in response to receiving the request, the transmission including information corresponding to the request and the derived second address,
    wherein the third circuit block is configured to receive the transmission of the second circuit block, and wherein the second address is assigned to the third circuit block;
    wherein the second circuit block comprises at least one configuration register for storing the first address;
    wherein the at least one configuration register is dynamically programmable; and
    wherein the at least one configuration register is programmable via the connection structure.

15. The electrical circuit of claim 14, wherein the connection structure is a bus system, a crossbar distributor, a connection matrix or a network-on-chip.

16. A method for transmitting information, comprising:
    providing a plurality of circuit blocks comprising a first circuit block, a second circuit block, and a third circuit block;
    sending a request from the first circuit block to the second circuit block, the request comprising a plurality of addresses, wherein the plurality of addresses of the request comprises a first address and a second address, the first address corresponding to the second circuit block, and the second address corresponding to the third circuit block;

initiating a transmission by the second circuit block in response to receiving the request, sending information corresponding to the request and a second address from the second circuit block to a third circuit block based on the second address, wherein the second address is assigned to the third circuit block;

wherein the second circuit block comprises at least one configuration register for storing the first address;

wherein the at least one configuration register is dynamically programmable; and wherein the at least one configuration register is programmable via the connection structure.

17. The method of claim 16, wherein sending a request from the first circuit block to the second circuit block comprises sending the first address from the first circuit block to a connection structure.

18. The method of claim 17, wherein sending a request from the first circuit block to the second circuit block comprises: sending an indicator from the first circuit block to the second circuit block.

19. The method of claim 18, wherein initiating a transmission by the second circuit block in response to receiving the request comprises: deriving the second address from the indicator.

20. The method of claim 16, further comprising:

sending an additional request from the first circuit block to the second circuit block, sending the additional request and information corresponding to the request from the second circuit block to a third circuit block based on the second address.

21. The method of claim 20, further comprising:

receiving the additional request and initiating an additional transmission by the third circuit block, and sending additional information corresponding to the additional request.

* * * * *